US011675428B2

(12) United States Patent
Danielsson et al.

(10) Patent No.: US 11,675,428 B2
(45) Date of Patent: Jun. 13, 2023

(54) DETERMINING A GAZE DIRECTION USING DEPTH INFORMATION

(71) Applicant: Tobii AB, Danderyd (SE)

(72) Inventors: Oscar Danielsson, Danderyd (SE); Daniel Johansson Torneus, Danderyd (SE)

(73) Assignee: Tobii AB, Danderyd (SE)

( * ) Notice: Subject to any disclaimer, the term of this patent is extended or adjusted under 35 U.S.C. 154(b) by 33 days.

(21) Appl. No.: 17/043,532

(22) PCT Filed: Mar. 29, 2018

(86) PCT No.: PCT/EP2018/058171
§ 371 (c)(1),
(2) Date: Dec. 22, 2020

(87) PCT Pub. No.: WO2019/185150
PCT Pub. Date: Oct. 3, 2019

(65) Prior Publication Data
US 2022/0129067 A1      Apr. 28, 2022

(51) Int. Cl.
*G06F 3/01*        (2006.01)
*G06T 7/593*      (2017.01)
*G06V 40/19*    (2022.01)

(52) U.S. Cl.
CPC .............. *G06F 3/013* (2013.01); *G06T 7/593* (2017.01); *G06V 40/19* (2022.01)

(58) Field of Classification Search
CPC .......... G06F 3/013; G06T 7/593; G06V 40/19
See application file for complete search history.

(56) References Cited

U.S. PATENT DOCUMENTS

| | | | | |
|---|---|---|---|---|
| 5,086,480 A | * | 2/1992 | Sexton ................ | H04N 19/503 382/253 |
| 10,671,173 B2 | * | 6/2020 | Peng ........................ | G06F 3/017 |
| 2012/0147328 A1 | * | 6/2012 | Yahav .................... | A61B 3/113 351/210 |
| 2014/0218281 A1 | * | 8/2014 | Amayeh ................. | A61B 3/14 345/156 |
| 2014/0375541 A1 | * | 12/2014 | Nister .................... | A61B 3/113 345/156 |
| 2015/0097925 A1 | * | 4/2015 | Choo .................... | G03H 1/2294 348/40 |
| 2015/0302665 A1 | * | 10/2015 | Miller ................ | G02B 27/0093 345/419 |
| 2017/0123233 A1 | * | 5/2017 | Sabovic .................. | A61B 3/08 |

OTHER PUBLICATIONS

International Search Report and Written Opinion of PCT/EP2018/058171.

* cited by examiner

*Primary Examiner* — Mihir K Rayan
(74) *Attorney, Agent, or Firm* — Christopher I. Moylan (57) ABSTRACT

A system and a method for determining a gaze direction of a user viewing a scene is provided. The system comprises a camera for obtaining an image of at least one of the user's eyes, a depth information detection device for obtaining depth data related to the image, and a processing unit. The processing unit is configured to define a surface at a predetermined position relative to the user's eye based on the depth data, obtain a normalized image by projecting the image onto the surface and determine a normalized gaze direction based on the normalized image. The processing unit is further configured to determine a gaze direction based on the normalized gaze direction and the depth data.

16 Claims, 5 Drawing Sheets

DETERMINING A GAZE DIRECTION USING DEPTH INFORMATION

TECHNICAL FIELD

The present disclosure generally relates to the field of eye tracking. In particular, the present disclosure relates to a system and method for determining a gaze direction using an image of a user's eye and depth data related to the image.

BACKGROUND

Several different eye tracking systems are known in the art. Such systems may for example be employed to allow a user to indicate a location at a computer display by looking at that point. The eye tracking system may capture images of the user's face, and then employ image processing to extract key features from the user's face, such as a pupil center and glints from illuminators illuminating the user's face. The extracted features may then be employed to determine where at the display the user is looking. Naturally, factors such as accuracy, speed, and reliability/robustness of the eye tracking are desirable to achieve a positive user experience.

For example, in "Eye tracking for everyone" (Krafka et al, MIT) a conventional neural network for eye tracking is trained using a large-scale dataset obtained by smartphones and tablets. However, the method described in "Eye tracking for everyone" requires a very large dataset for training, and still has a prediction error of 1.34 cm which may be significant for a small screen, such as a screen of a smartphone.

Thus, there is a need for an improved eye-tracking method.

SUMMARY

It would be advantageous to achieve an eye-tracking method overcoming, or at least alleviating, the above mentioned drawbacks. To better address one or more of these concerns, a system and method for determining a gaze direction of a user viewing a scene having the features defined in the independent claims are provided. Preferable embodiments are defined in the dependent claims.

Hence, according to a first aspect, a system for determining a gaze direction of a user viewing a scene is provided. The system comprises a camera for obtaining an image of at least one of the user's eyes, a depth information detection device for obtaining depth data related to the image, and a processing unit. The processing unit is configured to define a surface at a predetermined position relative to the user's eye based on the depth data, obtain a normalized image by projecting the image onto the surface and determine a normalized gaze direction based on the normalized image. The processing unit is further configured to determine a gaze direction based on the normalized gaze direction and the depth data.

According to a second aspect, a method for determining a gaze direction of a user viewing a scene is provided. The method comprises obtaining an image of a at least one of the user's eyes, obtaining depth data related to the image, and defining a surface at a predetermined position relative to the user's eye based on the depth data. The method further comprises obtaining a normalized image by projecting the image onto the surface, determining a normalized gaze direction based on the normalized image and determining a gaze direction based on the normalized gaze direction and the depth data.

By collecting depth information data, such as a depth image, a distance between the camera and different positions in the image can be determined. This distance may be used to define a surface at a predetermined position relative to the user's eye, onto which the image may be projected. With this projection, a normalized image may be obtained, such that any appearance variations between different images of the user's eye are reduced.

By normalizing an image before determining a normalized gaze direction, the differences between images may be reduced, thereby reducing the computer resources which may be needed for the calculations and the amount of training data needed. Using normalized images may further reduce the prediction error of the method. In other solutions, the input eye images vary dramatically with different factors. For example, the size of the eye region may vary in comparison to the size of the eye image. With varying images, the gaze estimation method would require a considerable amount of computation to handle and compensate for the variations.

By normalizing the images, a normalized gazed direction may be determined. The normalized gaze direction may then be used to determine the gaze direction of the user. The determination of the gaze direction of the user may further be based on camera imaging parameters and the position and orientation of the surface.

This is based on the realization that the determination of a gaze direction may be optimized using a smaller set of input data if depth data is obtained and used. By normalizing the images the amount of input variation that the machine learning-based gaze estimator has to handle is decreased. Thus it is more likely that the determination of the gaze direction may be performed successfully, and a simpler algorithm or model may be used.

It has further been realized that this normalization may be performed by defining a surface at a predetermined distance from the user's eye or face and projecting the captured image onto that surface. In this way, eyes may be analyzed in substantially the same way using the same logic or algorithms, without having to take big differences in angles and distances into account. In this way, the normalized image on the determined surface will be invariant to user motion (perspective transformation), camera focal length, and other intrinsic camera parameters.

By the term "image" it may be meant a 2D representation. "Depth data" may be interpreted as distance data, and may in combination with the image comprise sufficient information for creating a 3D representation of an object.

By the terms "normalizing" and "normalized images" it may be meant that variations of the images are reduced. For example, the normalized image on the determined surface will be invariant to user motion.

A "gaze direction" may, for example, be a vector indicating a direction in a space along which the user is gazing. By "normalized gaze direction" it may be meant a gaze direction in relation to the normalized images, i.e. not necessarily in relation to the original images or the camera image place.

By "surface" it may be meant any type of surface which is suitable for projecting an image of at least one of a user's eyes onto. For example, the surface may be a plane (such as a virtual image plane), a cylinder, or a sphere, or a 3D reconstruction of the user's face.

A "scene" may, for example, be a monitor, a screen, a smartphone or a tablet, or another device displaying information. A "scene" may also be a real world scene or an object.

According to an embodiment of the system, the processing unit may be further configured to determine the normalized gaze direction using a machine learning logic.

According to an embodiment of the method, the method may further comprise determining the normalized gaze direction using a machine learning logic.

The machine learning logic may, for example, comprise a neural network, a regression tree, a gradient boosting regressor, or an AdaBoost regressor. In general, the logic may be any function of the form d=F(Iv, theta), where d is a normalized gaze direction (a vector), Iv is the normalized image and theta is a (large) vector of parameters learned from previous examples.

In some embodiments, the input to the machine learning logic may also comprise the depth data.

By using a machine learning logic, the logic for determining the normalized gaze direction does not have to be hard coded or defined in a specific algorithm, but the logic may learn and improve with more input data.

Further, by using normalized images as input, the amount of input variation that a machine learning-based gaze estimator has to handle may be decreased. Thus it is more likely that the algorithm may be trained successfully, and a simpler model with smaller footprint may be used. Further, less training data may be required as compared to using non-normalized images.

The camera and the depth sensor may in some embodiments of the system be arranged at predetermined positions relative to the scene, and the depth sensor may be further configured to determine a distance between the sensor and at least one of the user's eyes. The processing unit may be further adapted to determine a point of interest at or on the scene based on the determined gaze direction, the determined distance and the predetermined positions.

According to an embodiment of the method, a camera obtaining the image and a depth detection device obtaining the depth data are arranged at predetermined positions from the scene. The method may further comprise obtaining a distance between the depth detection device and the user, and determining a point of interest at or on the scene based on the determined gaze direction, the determined distance and the predetermined positions.

By "point of interest" it may be meant the point on the scene that the user is looking at. The point of interest may be determined by determining where the gaze direction intersects the scene or an object in the scene.

By determining a point of interest, an area or an object on the scene that the user is interested in or wants to interact with may be determined.

According to an embodiment of the system, the obtaining of normalized images may further comprise adjusting pixel intensities based on the position of said at least one eye relative to the camera.

According to an embodiment of the method, the obtaining of normalized images may further comprise adjusting pixel intensities based on the position of said at least one eye relative to the camera.

Since depth data are obtained, the position of the at least one eye of the user relative to the camera is known. This data may be used to adjust pixel intensities, i.e. to compensate for varying distances between a user and illuminator, to counter the effect of the inverse relationship between distance and brightness.

Pixel intensities may be adjusted based on other factors, such as shadows caused by obstacles or light angle of incidence affecting the brightness.

According to an embodiment of the first aspect, the processing unit may be further adapted to create a 3D reconstruction based on the depth data and the image.

The method may comprise creating a 3D reconstruction based on the depth data.

The surface may, in some examples, be a plane arranged tangent to a surface of the 3D reconstruction. The image may then be projected onto the plane by, for each pixel in the plane (or virtual image plane), drawing a straight line from the point to the camera center of projection and find the intersection of that line with the camera image plane. The pixel value of the image at the point of intersection may be used for the pixel on the plane.

According to an embodiment, the surface is arranged at the user's eye in the 3D reconstruction.

By arranging the surface at the user's eye, the normalized image may mostly contain data relating to the image of the eye, i.e. irrelevant data may be minimized.

According to an embodiment of the system, the camera is a near-infrared, NIR, camera or a RGB camera, but also other types of cameras capable of capturing sufficient information for determining a gaze direction of a user may be used to advantage.

According to an embodiment of the first aspect, the depth information detection device comprises a time-of-flight sensor, a stereo camera, or multi-cameras, or is adapted to employ structured light, a phase pixel method, or ultra sound.

According to an embodiment of the second aspect, the depth data may be determined using a time of flight method, employing structured light, stereo or multi cameras, a phase pixel method, or ultra sound.

The scene may, in some embodiments, be a display for presenting information. For example, the scene may be a display image on a display apparatus, for example, a smartphone or a tablet. It may alternatively be a real world scene image, for example, the scene may be related to an in-car eye tracking system.

According to an embodiment of the second aspect, the method may further comprise tracking the gaze direction of a user viewing a scene over time. In this way, a user's eye movements and point of interest may be tracked over time.

BRIEF DESCRIPTION OF DRAWINGS

This and other aspects will now be described in more detail in the following illustrative and non-limiting detailed description of embodiments, with reference to the appended drawings.

All the figures are schematic, not necessarily to scale, and generally only show parts which are necessary in order to elucidate the embodiments, wherein other parts may be omitted. Like reference numerals refer to like elements throughout the description.

DETAILED DESCRIPTION

Figure 1:
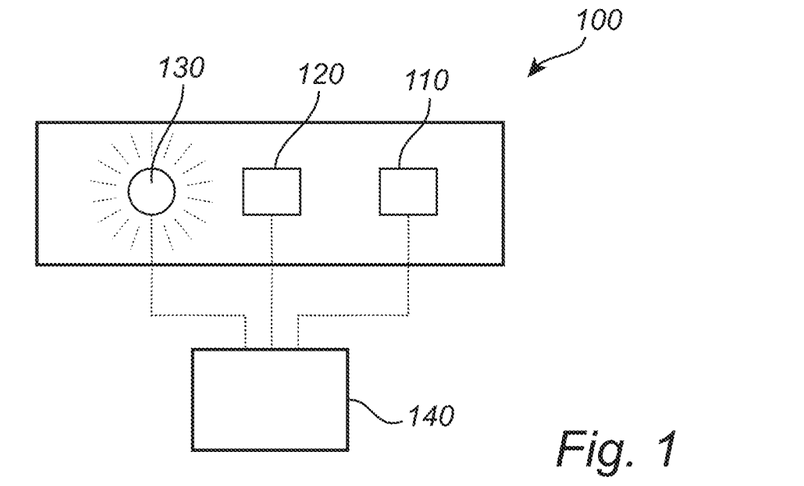
FIG. 1 shows a schematic view of a system for determining a gaze direction according to an embodiment.

A system for determining a gaze direction according to an embodiment will be described with reference to FIG. 1. FIG.

1 shows a schematic view of a system 100 for determining a gaze direction. The system 100 comprises a camera 110, a depth detection device 120 and a processing unit 140. The system 100 may further comprise an illuminator 130.

The camera 110 is adapted to capture an image of a user viewing a scene, comprising at least an image of one of the user's eyes. The depth detection device 120 is adapted to obtain depth information related to the image captured by the camera 110. The illuminator 130 may be used to illuminate at least part of the user. The processing unit 140 may be connected to the camera 110, the depth detection device 120, and the illuminator 130 and control their respective functions or receive data from them. The processing unit 140 may be wirelessly or by wire connected to the camera 110, the depth detection device 120 and the illuminator 130. They may be comprised in one device, or the processing unit 140 may be distributed at a location different from the camera 110, the depth detection device 120 and the illuminator 130, and, for example, be accessible over the Internet.

The camera 110 may, for example, be a near-infrared, NIR, camera or a RGB camera.

The depth information device 120 may, for example comprise a time-of-flight sensor, a stereo camera, or multi-cameras, or is adapted to employ structured light, a phase pixel method or ultra sound.

The processing unit 140 may be any type of multi-purpose processing means, such as a computer, a smartphone, a tablet or any other type of processing means suitable for receiving data from the camera 110 and the depth detection device 120.

Figure 2:
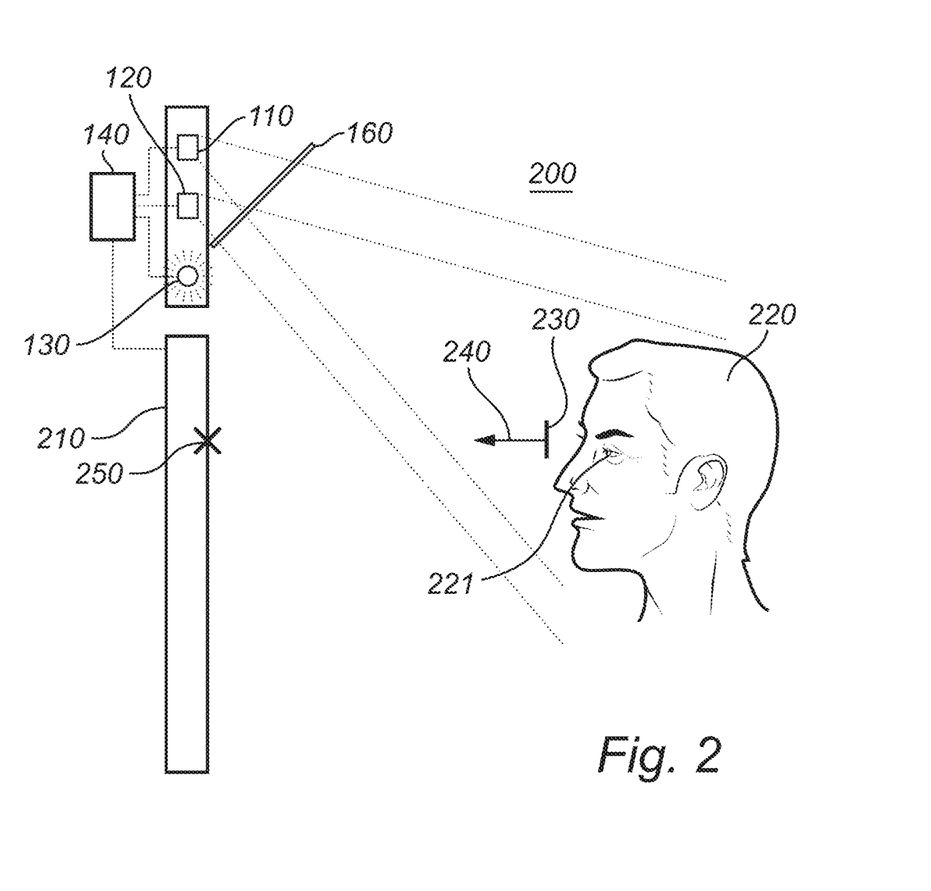
FIG. 2 shows a schematic view of a system for determining a gaze direction of a user viewing a scene.

FIG. 2 shows a schematic view of a system 100 for determining a gaze direction 240 of a user 220 viewing a scene 210. The system 100 may be similar to the system described with reference to FIG. 1.

The scene 210 may, for example, be a monitor, a screen, a smartphone or a tablet, or another device displaying information. The scene 210 may be connected to the processing unit 140. By having the scene 210 connected to the processing unit 140, the processing unit 140 may control and/or receive information from the scene 210. For example, the processing unit 140 may control and/or receive information regarding a calibration pattern displayed on the scene 210.

The camera 110 may capture an image of the user 220, including at least one 221 of the user's eyes. The camera 110 may be considered to have an image plane illustrated by line 160. The depth information device 120 may obtain depth information relating to the image captured by the camera 110. The processing unit 140 may receive the image and the depth information from the camera 110 and the depth information device 120. The processing unit 140 may, using the depth data, define a virtual surface 230 at a predetermined position from the at least one 221 of the user's eyes.

The surface 230 may be a virtual image plane, a sphere, a cylinder or any other shape suitable for normalizing an image comprising a user's eye. The surface 230 may be arranged tangent to a facial surface as defined by the depth data. The processing unit 140 may define a local coordinate system on the surface 230 such that the x-axis points from the eye center to the eye corner. The local coordinate system may be used for determining a normalized gaze direction in the local coordinate system.

The processing unit 140 may create a reconstruction of the image in 3D based on the image and the depth information. The 3D reconstruction may be updated with any movements of the user 220. The surface 230 may be defined centered at the user's eye 221 in the 3D reconstruction, and may follow the user's eye 221 if it moves in the 3D reconstruction.

The processing unit 140 may be further configured to project the image captured by the camera 110 onto the surface 230 to obtain a normalized image. This may be performed as follows. For each point or pixel on the surface 230, draw a straight line from the point to the camera center of projection and find the intersection of that line with the camera image plane 160. Copy the pixel value of the image at the point of intersection to the pixel on the surface 230. The projection may also be based on camera imaging parameters or the position and orientation of the surface.

The processing unit 140 may be further configured to adjust pixel intensities of the normalized image on the surface 230. The adjusting of the pixel intensities may compensate for varying distance between the user 220 and an illuminator 130, to counter the effect of the inverse relationship between distance and brightness. The pixels of the normalized image may also be adjusted for other factors, e.g. shadows caused by obstacles or light angle of incidence, affecting the brightness. The adjusting may alternatively be performed before the image is projected onto the surface 230.

The processing unit 140 may be further configured to determine a normalized gaze direction based on the normalized image. The determination may, in some examples, be further based on the depth data. The normalized gaze direction may be obtained by a machine learning logic or algorithm. The machine learning logic may, for example, comprise a neural network, a regression tree, a gradient boosting regressor, or an AdaBoost regressor. In general, the logic or algorithm may be any function of the form d=F(Iv, theta), where d is a normalized gaze direction (a vector), Iv is the normalized image and theta is a (large) vector of parameters learned from previous example data.

Based on the determined normalized gaze direction, the processing unit 140, may determine a gaze direction 240 of the user 220. The gaze direction 240 may also be based on the depth data.

By using depth data, the normalized image and information regarding the placement of the surface 230, a point of interest 250 may be determined where the gaze direction 240 intersects the scene 210. This may be further based on information regarding the positions of camera 110 and the depth sensor 120 relative to the scene 210.

Figure 3:
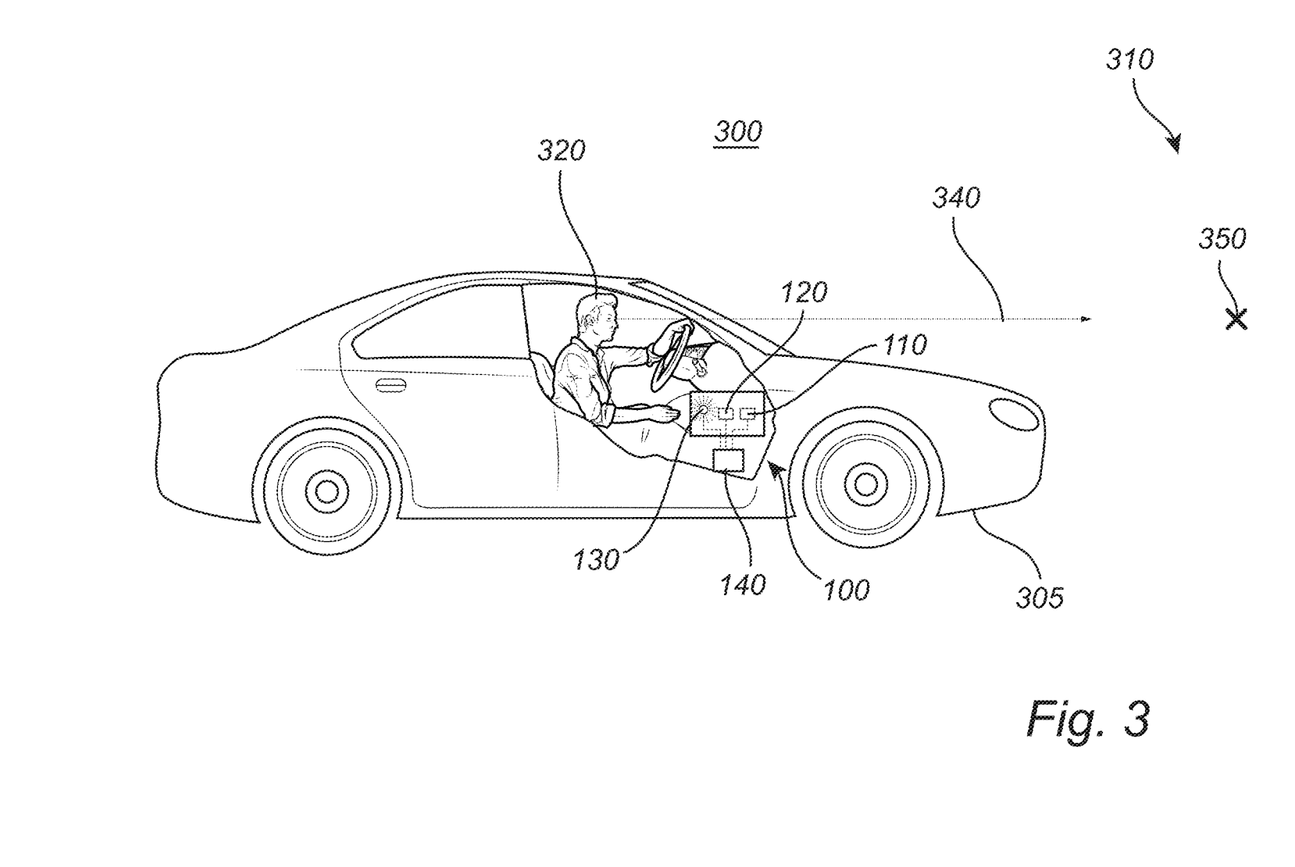
FIG. 3 shows a schematic view of a system for determining a gaze direction of a user in a vehicle.

FIG. 3 shows a schematic view of a system 100 for determining a gaze direction 340 of a user 320 viewing a scene 310. In this example the user 320 is in a vehicle 305 and views a real world scene 310 outside of the vehicle 305. The system 100 may also be used for a real word scene when the user is not in a vehicle. The system 100 may be identical to the system described with reference to FIG. 1.

Figure 4A:
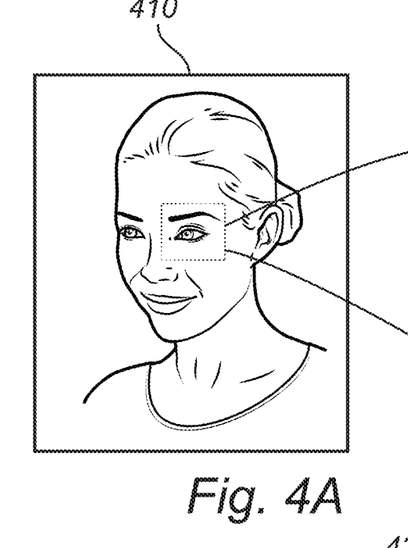
FIGS. 4A, 4B, 4C and 4D illustrate example data.
Figure 4B:
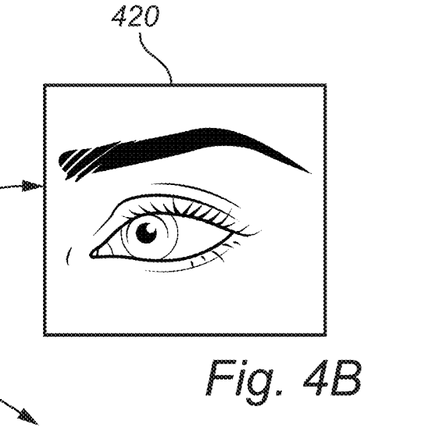
Figure 4C:
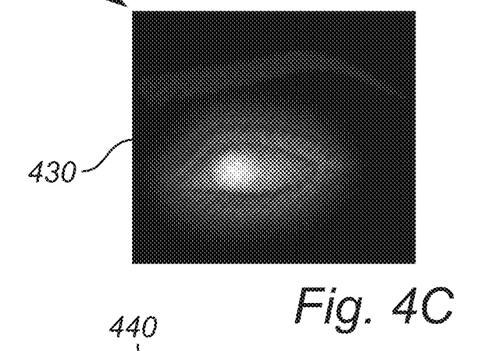
Figure 4D:
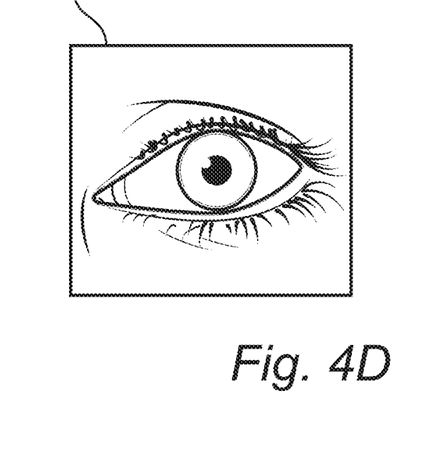

FIGS. 4A, 4B, 4C, and 4D show illustrations of example data. FIG. 4A shows an image of a user comprising at least one of the user's eyes. From this image, a cropped image as shown FIG. 4B comprising an eye of the user may be determined. FIG. 4C shows an illustration of depth data relating to the image shown in FIG. 4B. Based on the cropped image and the depth data, a normalized image may be determined, as illustrated in FIG. 4D.

Figure 5A:
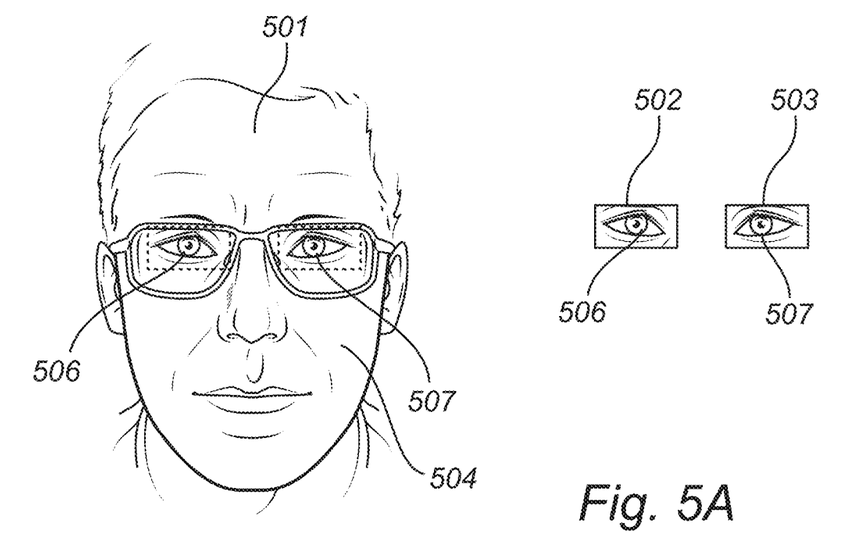
FIGS. 5A and 5B illustrate example images and normalized images.

FIG. 5A shows example images as captured by a camera. An image 501 has been captured of a user's face 504, including the user's eyes 506, 507. Smaller images 502, 503 comprising the user's respective eyes 506, 507 may be extracted and normalized as described above with reference to the system.

Figure 5B:
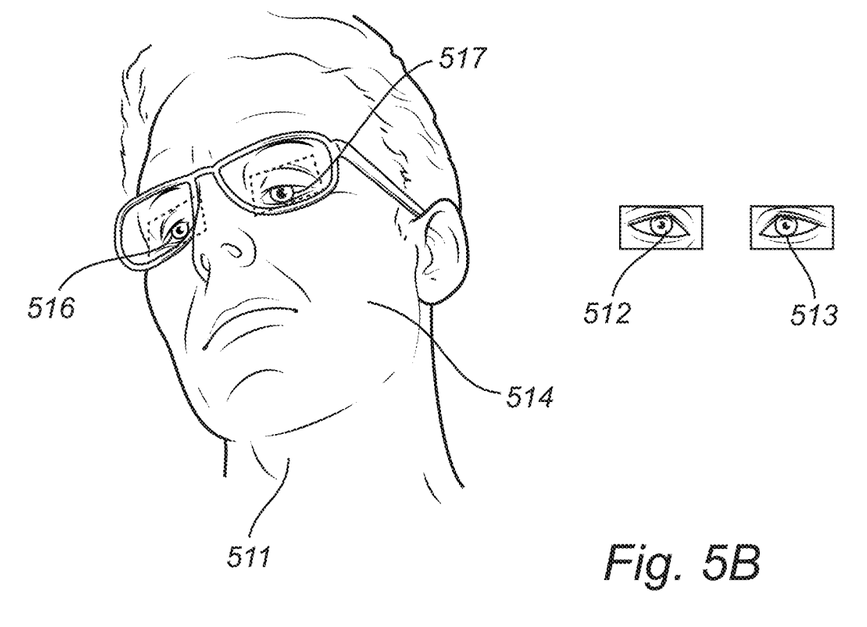

FIG. 5B shows an example similar to the one shown in FIG. 5A, except that the image 504 has been captured at a smaller angle relative the users face 514. Also from this image, smaller images 512, 513 comprising the user's respective eyes 516, 517 may be extracted and normalized as described above with reference to the system.

By normalizing the images 502, 503, 505, 506, the images 502, 503, 505, 506 of the eyes are more similar each other than the original images. In this way, it may be easier, i.e. require less computing power, to determine a gaze direction for the eyes in the images.

Figure 6:
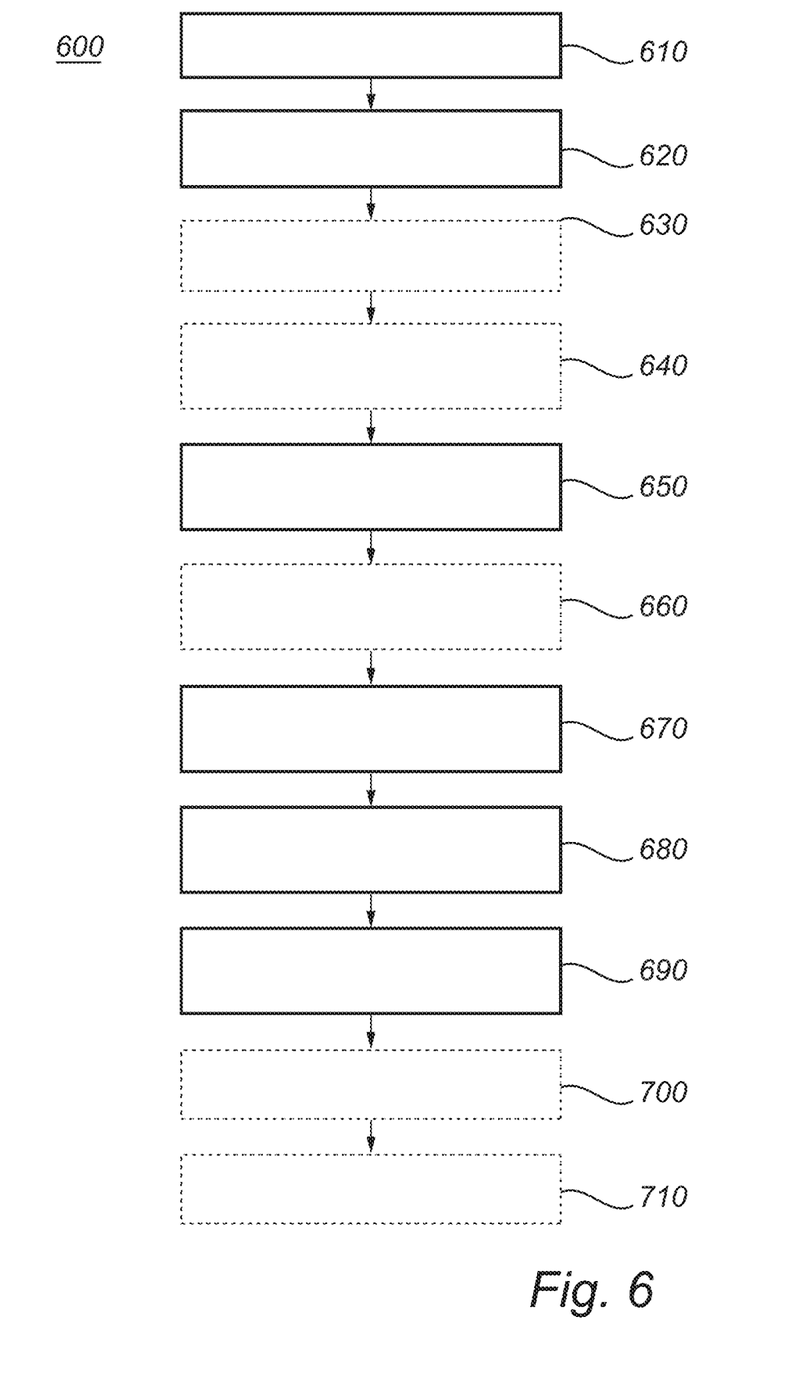
FIG. 6 illustrates a method for determining a gaze direction according to an embodiment.

FIG. 6 illustrates a method 600 for determining a gaze direction according to an embodiment. The boxes drawn in dashed lines indicate that the corresponding steps are optional. The method 600 comprises obtaining 610 an image of a at least one of the user's eyes, obtaining 620 depth data related to the image, and defining 650 a surface at a predetermined position relative to the user's eye based on the depth data. In some examples, the method 600 may further comprise obtaining 630 a distance between the depth detection device and the user and creating 640 a 3D reconstruction based on the depth data and the image The method 600 may further comprise defining 650 a surface at a predetermined position relative to the user's eye based on the depth data, obtaining 670 a normalized image by projecting the image onto the surface, determining 680 a normalized gaze direction based on the normalized images, and determining 690 a gaze direction based on the normalized gaze directing and the depth data. In some examples, the obtaining of normalized images further comprises adjusting 660 pixel intensities based on the position of said at least one eye relative to the camera.

The method 600 may, in some examples, comprise determining 710 a point of interest at or on the scene based on the determined gaze direction, the determined distance between the depth detection device and the user and the predetermined positions, wherein the camera and the depth detection device are arranged at predetermined positions from the scene.

The method may further comprise tracking 700 the gaze direction of a user viewing a scene over time.

The person skilled in the art realizes that the present invention by no means is limited to the embodiments described above. On the contrary, many modifications and variations are possible within the scope of the appended claims.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A system for determining a gaze direction of a user viewing a scene, the system comprising:
   a camera for obtaining an image of at least one of the user's eyes;
   a depth information detection device for obtaining depth data related to the image;
   a processing unit configured to:
   define a surface at a predetermined position relative to the user's eye based on the depth data;
   obtain a normalized image by projecting the image onto the surface;
   determine a normalized gaze direction based on the normalized image;
   determine a gaze direction based on the normalized gaze direction and the depth data.

2. The system of claim 1, wherein the processing unit is further configured to determine the normalized gaze direction using a machine learning logic.

3. The system of claim 1, wherein
   the camera and the depth sensor are arranged at predetermined positions relative to the scene, and
   the depth sensor is further configured to determine a distance between the sensor and at least one of the user's eyes; and
   the processing unit is further adapted to determine a point of interest at or on the scene based on the determined gaze direction, the determined distance and the predetermined positions.

4. The system of claim 1, wherein the obtaining of normalized images further comprises adjusting pixel intensities based on the position of said at least one eye relative to the camera.

5. The system of claim 1, wherein the processing unit is further adapted to create a 3D reconstruction based on the depth data and the image.

6. The system of claim 5, wherein the surface is a plane arranged tangent to a surface of the 3D reconstruction.

7. The system of claim 6, wherein the surface is arranged at the user's eye in the 3D reconstruction.

8. The system of claim 1, wherein the camera is a near-infrared, NIR, camera or a RGB camera.

9. The system of claim 1, wherein the depth information detection device comprises a time-of-flight sensor, a stereo camera, or multi-cameras, or is adapted to employ structured light, a phase pixel method, or ultra sound.

10. The system of claim 1, wherein the scene is a display for presenting information.

11. A method for determining a gaze direction of a user viewing a scene comprising:
    obtaining an image of a at least one of the user's eyes,
    obtaining depth data related to the image,
    defining a surface at a predetermined position relative to the user's eye based on the depth data;
    obtaining a normalized image by projecting the image onto the surface;
    determining a normalized gaze direction based on the normalized image;
    determining a gaze direction based on the normalized gaze directing and the depth data.

12. The method of claim 11, further comprising determining the normalized gaze direction using a machine learning logic.

13. The method of claim 11, wherein a camera obtaining the image and a depth detection device obtaining the depth data are arranged at predetermined positions from the scene; and
    the method further comprises:
    obtaining a distance between the depth detection device and the user; and
    determining a point of interest at or on the scene based on the determined gaze direction, the determined distance and the predetermined positions.

14. The method of claim 11, wherein the obtaining of normalized images further comprises adjusting pixel intensities based on the position of said at least one eye relative to the camera.

15. The method of claim 11, wherein the depth data is determined using a time of flight method, employing structured light, stereo or multi cameras, a phase pixel method, or ultra sound.

16. The method of claim 11, further comprising tracking the gaze direction of a user viewing a scene over time.

* * * * *